US006782782B1

(12) United States Patent
Shangle et al.

(10) Patent No.: US 6,782,782 B1

(45) Date of Patent: Aug. 31, 2004

(54) CROWN MOLDING JIG DEVICE

(76) Inventors: Stephen J. Shangle, 109 Belluscio St., Jamesburg, NJ (US) 08831; Keith A. Shangle, 109 Belluscio St., Jamesburg, NJ (US) 08831

( * ) Notice: Subject to any disclaimer, the term of this patent is extended or adjusted under 35 U.S.C. 154(b) by 0 days.

(21) Appl. No.: 10/115,619

(22) Filed: Apr. 2, 2002

(51) Int. Cl.[7] .............................. B26D 7/01; B23Q 3/00

(52) U.S. Cl. ........................ 83/467.1; 83/471.3; 83/581

(58) Field of Search ............................ 83/467.1, 468.1, 83/468.2, 468.3, 468.7, 471.2, 471.3, 473, 477.1, 490, 581

(56) References Cited

U.S. PATENT DOCUMENTS 976,296 A * 11/1910 Robbins ...................... 83/765

4,429,601 A * 2/1984 Taylor .......................... 83/767

4,743,004 A * 5/1988 Kloss .......................... 269/296

4,875,399 A * 10/1989 Scott et al. ................ 83/471.3

6,481,320 B1 * 11/2002 McGrory et al. .......... 83/471.3

* cited by examiner

*Primary Examiner*—Stephen Choi

(57) ABSTRACT

A crown molding jig device for mitering the ends of crown molding stock. The crown molding jig device includes a first template member being a first elongate multi-sided support member having a first base portion and a first planar wing portion extending along and outwardly from a longitudinal side of the first base portion and being adapted to support a crown molding stock upon a cutting device; and also includes a second template member also being an elongate multi-sided support member having a second base portion and a second planar wing portion extending along and outwardly from a longitudinal side of the second base portion and being adapted to support a crown molding stock upon the cutting device.

3 Claims, 5 Drawing Sheets

CROWN MOLDING JIG DEVICE

BACKGROUND OF THE INVENTION

1. Field of the Invention

The present invention relates to molding jigs and more particularly pertains to a new crown molding jig device for mitering the ends of crown molding stock.

2. Description of the Prior Art

The use of molding jigs is known in the prior art. More specifically, molding jigs heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,560,273; 4,875,399; U.S. Pat. No. Des. 406,035; 3,935,779; 3,782,235; and 3,397,722.

While these devices fulfill their respective, particular objectives and requirements, the aforementioned patents do not disclose a new crown molding jig device. The prior art describes inventions having particular shaped miter boxes and templates used to cut various structural items.

SUMMARY OF THE INVENTION

The general purpose of the present invention, which will be described subsequently in greater detail, is to provide a new crown molding jig device which has many of the advantages of the molding jigs mentioned heretofore and many novel features that result in a new crown molding jig device which is not anticipated, rendered obvious, suggested, or even implied by any of the prior art molding jigs, either alone or in any combination thereof. The present invention includes a first template member being a first elongate multi-sided support member having a first base portion and a first planar wing portion extending along and outwardly from a longitudinal side of the first base portion and being adapted to support a crown molding stock upon a cutting device; and also includes a second template member also being an elongate multi-sided support member having a second base portion and a second planar wing portion extending along and outwardly from a longitudinal side of the second base portion and being adapted to support a crown molding stock upon the cutting device. None of the prior art includes the types of first and second template members described in the present invention.

There has thus been outlined, rather broadly, the more important features of the crown molding jig device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new crown molding jig device which has many of the advantages of the molding jigs mentioned heretofore and many novel features that result in a new crown molding jig device which is not anticipated, rendered obvious, suggested, or even implied by any of the prior art molding jigs, either alone or in any combination thereof.

Still another object of the present invention is to provide a new crown molding jig device for mitering the ends of crown molding stock.

Still yet another object of the present invention is to provide a new crown molding jig device that is easy and convenient to set up and use.

Even still another object of the present invention is to provide a new crown molding jig device that allows contractors to quickly and accurately miter the edges of crown molding stock.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
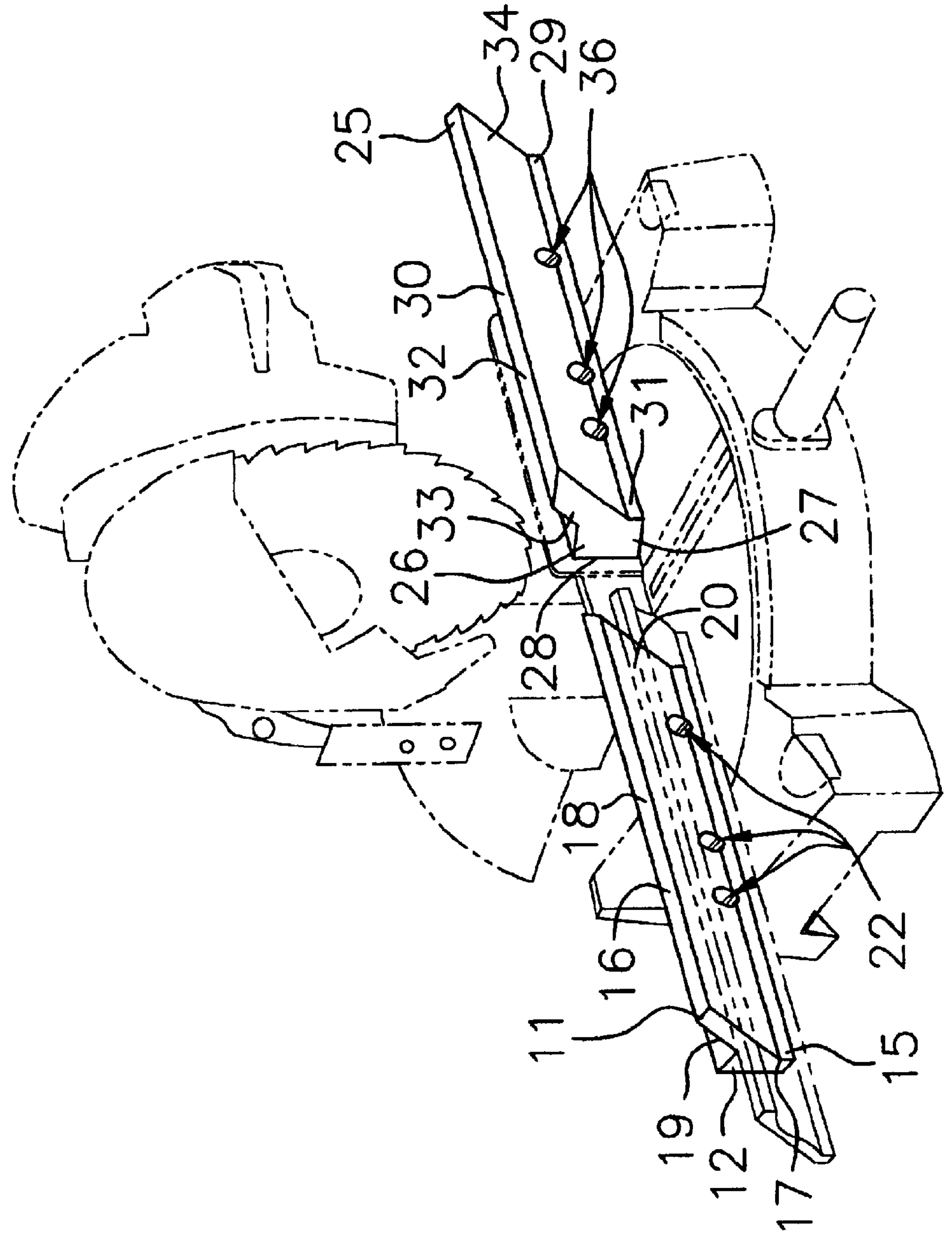
FIG. 1 is a perspective view of a new crown molding jig device according to the present invention and shown in use.
Figure 2:
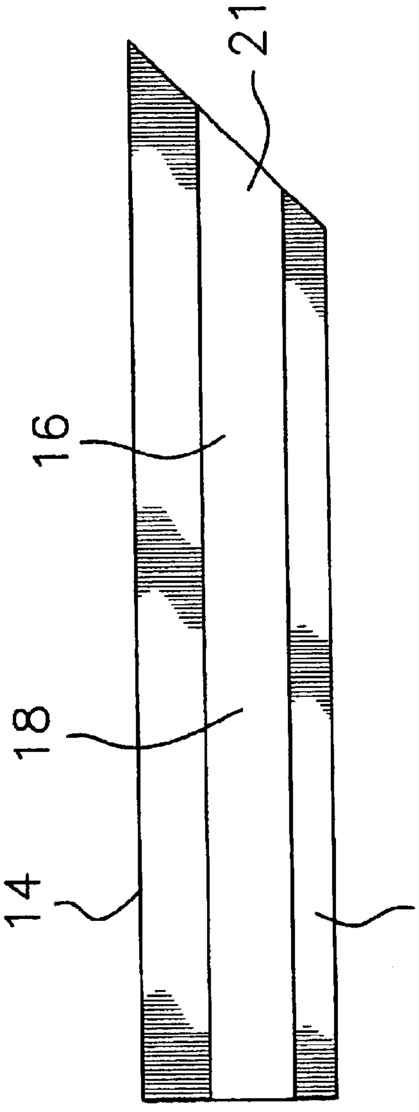
FIG. 2 is a top plan view of a first template member of the present invention.
Figure 3:
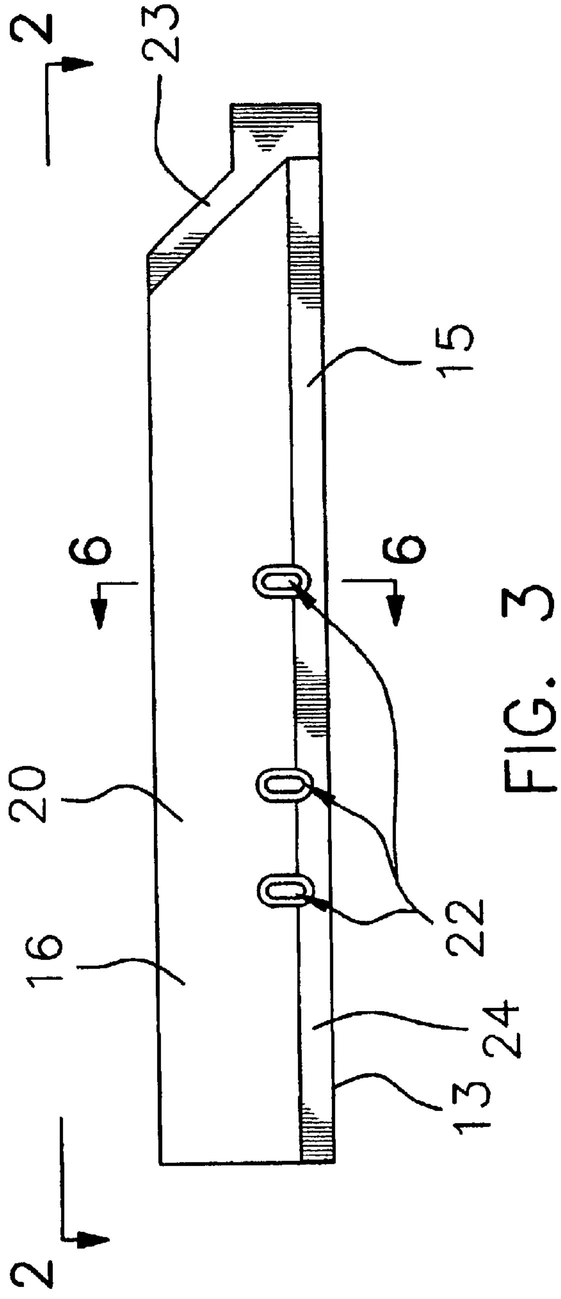
FIG. 3 is a back side elevational view of the first template member of the present invention.
Figure 4:
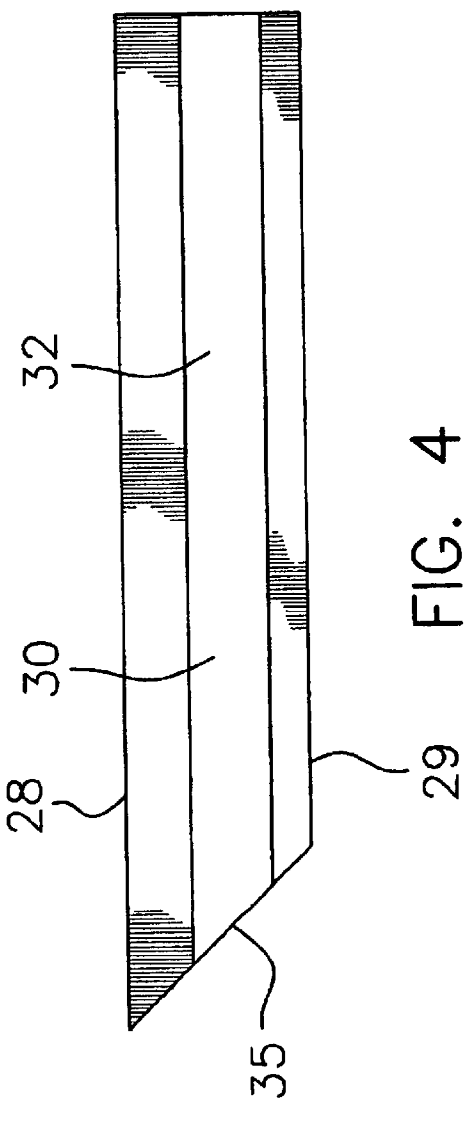
FIG. 4 is a top plan view of second template member of the present invention.
Figure 5:
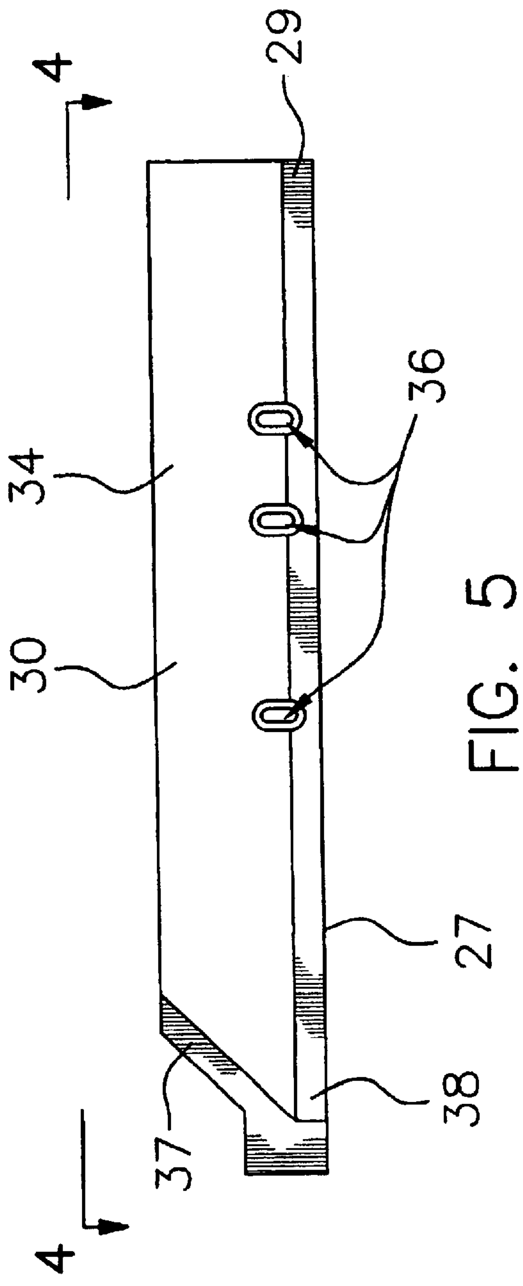
FIG. 5 is a back side elevational view of the second template member of the present invention.
Figure 6:
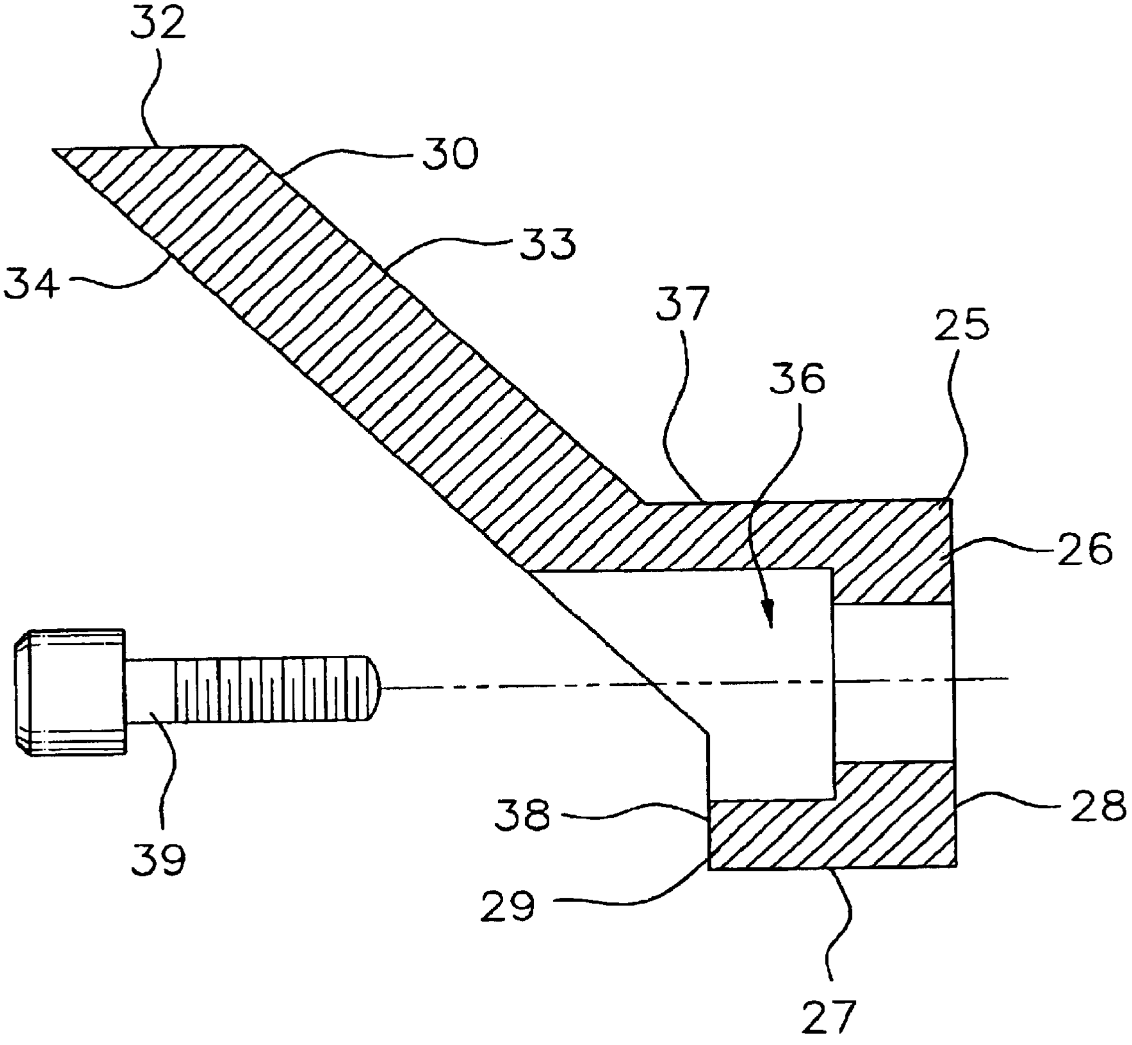
FIG. 6 is a lateral cross-sectional view of the first template member of the present invention.
Figure 7:
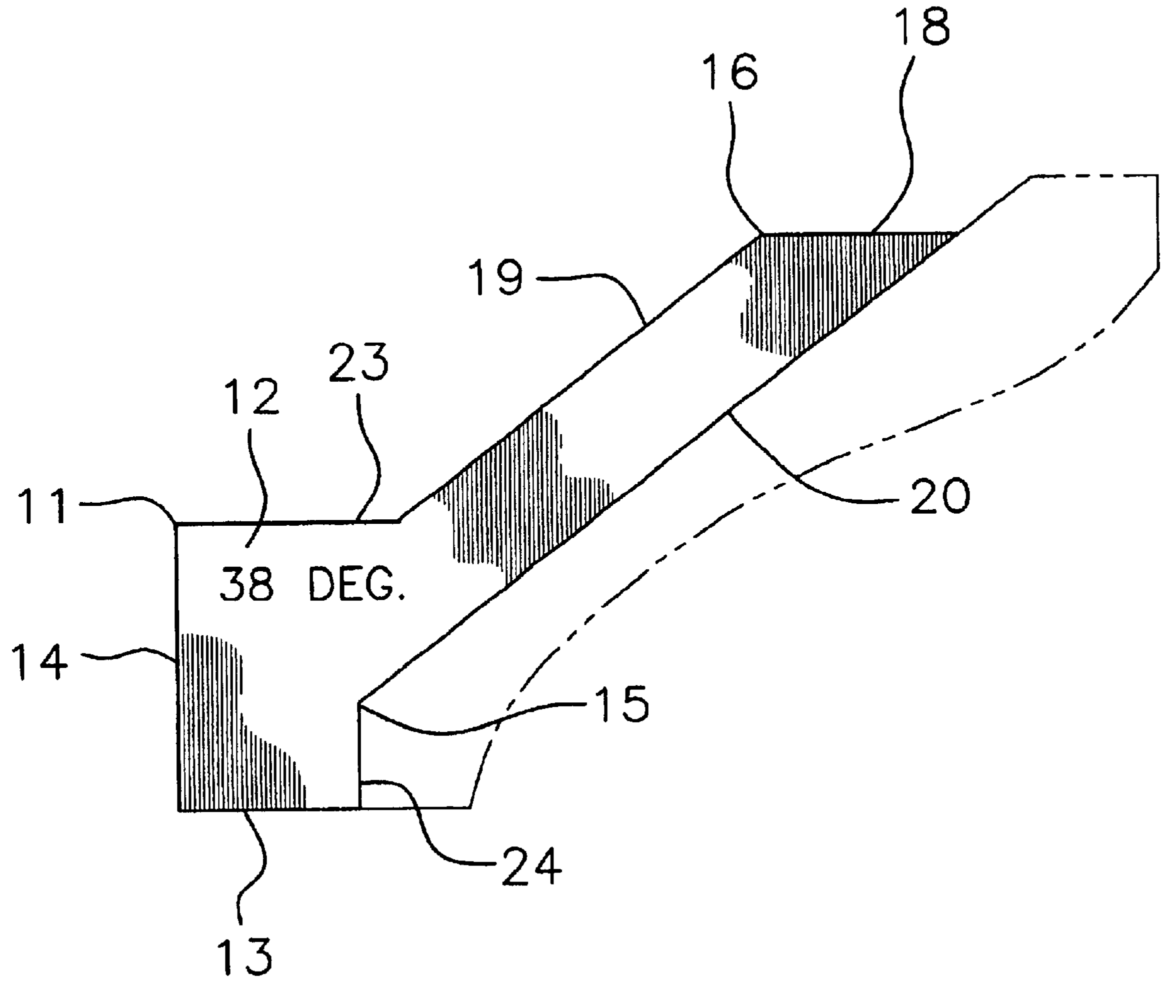
FIG. 7 is an end elevational view of the second template member of the present invention.

With reference now to the drawings, and in particular to FIGS. 1 through 7 thereof, a new crown molding jig device embodying the principles and concepts of the present invention and generally designated by the reference numeral 10 will be described.

As best illustrated in FIGS. 1 through 7, the crown molding jig device 10 generally comprises a first template member 11 being a first elongate multi-sided support member having a first base portion 12 and a first planar wing portion 16 integrally extending along and outwardly from a longitudinal side of the first base portion 12 and being adapted to support a crown molding stock upon a cutting device.

A second template member 25 also has an elongate multi-sided support member having a second base portion 26 and a second planar wing portion 30 integrally extending along and outwardly from a longitudinal side of the second base portion 26 and being adapted to support a crown molding stock upon the cutting device. Each of the first and second base portions 12,26 has a definite lateral thickness and also has a generally flat bottom side 13,27 and a generally flat back side 14,28. Each of the first and second base portions 12,26 further has a front side 15,29 having an upper portion 23,37 and a generally flat lower portion 24,38. Each of the first and second planar wing portions 16,30 has a first longitudinal edge 17,31 which is integrally attached to the upper portion 23,37 of the front side 15,29 of a respective the first and second base portions 12,26. Each of the first and second planar wing portions 16,30 extend outwardly from a respective first and second base portions 12,26 at approximately 38 degrees relative to the bottom side 13,27 thereof. Each of the first and second planar wing portions 16,30 has a definite thickness and a definite width and also has a length substantially equal to that of a respective first and second base portions 12,26. Each of the first and second planar wing portions 16,30 has a generally flat upper side 19,33 which faces generally upwardly, and also has a generally flat lower side 20,34 which faces generally downwardly. Each of the first and second planar wing portions 16,30 has a second longitudinal edge 18,32 which is generally disposed parallel to the bottom side 13,27 of a respective first and second base portions 12,26. The first and second template members 11,25 further have a plurality of holes 22,36 being spaced apart and being disposed through the first and second base portions 12,26 and through portions of the lower sides 20,34 and first longitudinal edges 17,31 of the first and second planar wing portions 16,30. The holes 22,36 extend through the front and back sides 14,15, 28,29 of the first and second base portions 12,26 and are adapted to receive fasteners for fastening the first and second template members 11,25 to the cutting device. Each of the first and second template members 11,25 has an end 21,35 which is slanted at approximately 45 degrees relative to the longitudinal sides thereof.

In use, the user places the crown molding stock upon the first and second template members 11,25 and uses the cutting device or saw to cut the ends of the crown molding device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the crown molding jig device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A crown molding jig device comprising:

a first template member being a first elongate multi-sided support member having a first base portion and a first planar wing portion extending along and outwardly from a longitudinal side of said first base portion and supporting a crown molding stock upon a cutting device; and a second template member also being an elongate multi-sided support member having a second base portion and a second planar wing portion extending along and outwardly from a longitudinal side of said second base portion and supporting a crown molding stock upon the cutting device, each of said first and second base portions having a thickness and also has a generally flat bottom side and a generally flat back side, each of said first and second base portions further having a front side having an upper portion and a generally flat lower portion, each of said first and second planar wing portions having a first longitudinal edge which is integrally attached to said upper portion of said front side of a respective said first and second base portions, each of said first and second planar wing portions extending outwardly from a respective said first and second base portions at approximately 38 degrees relative to said bottom side thereof, each of said first and second planar wing portions having a thickness and a width and also having a length substantially equal to that of a respective said first and second base portions, each of said first and second planar wing portions having a generally flat upper side which faces generally upwardly, and also having a generally flat lower side which faces generally downwardly, said first and second template members further having a plurality of holes being spaced apart and being disposed through said first and second base portions and through portions of said lower sides and first longitudinal edges of said first and second planar wing portions.

2. A crown molding jig device as described in claim 1, wherein said holes extend through said front and back sides of said first and second base portions and are adapted to receive fasteners for fastening said first and second template members to the cutting device.

3. A crown molding jig device as described in claim 2, wherein each of said first and second template members has an end which is slanted at approximately 45 degrees relative to said longitudinal sides thereof.

* * * * *